Patented Nov. 7, 1933

1,934,012

UNITED STATES PATENT OFFICE 1,934,012

WATERSOLUBLE FORMALDEHYDE - BISULPHITE AMINO-ARYL ANTIMONY ARSENIC COMPOUNDS

Hans Schmidt, Vohwinkel, near Elberfeld, Germany, assignor to Winthrop Chemical Company, Inc., New York, N. Y., a corporation of New York No Drawing. Original application November 1, 1929, Serial No. 404,216, and in Germany November 6, 1928. Divided and this application February 27, 1931. Serial No. 518,914

2 Claims. (Cl. 260—11)

The present invention relates to water-soluble formaldehyde bisulphite amino-aryl-antimony-arsenic compounds and to a process of preparing the same.

In accordance with the present invention stable watersoluble derivatives from amino-aryl-antimony-arsenic compounds are obtainable by reacting upon an amino-aryl-antimony-arsenic compound with formaldehyde-bisulphite in aqueous solution. Equivalent to the reaction with formaldehyde-bisulphite is the reaction of first with formaldehyde and then with bisulphite. Amino - aryl - antimony - arsenic compounds suitable as starting materials for the purpose of the invention are, for example, compounds of the probable general formula:

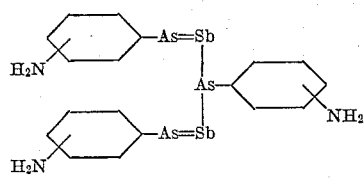

the benzene nuclei of which may be further substituted by monovalent substituents, for example, hydroxyl groups.

When starting from compounds containing salt forming groups it will be advantageous to use the compounds in the form of a watersoluble salt, for example, an alkali metal salt. The process may be carried out at various temperatures, room temperature or slightly elevated temperatures, say temperatures of up to about 50° C. The solution is neutralized by the addition of an alkali, such as sodium carbonate, and the new compound is precipitated by pouring the solution into a precipitant, such as methylalcohol. In case oxidizable compounds are subjected to my new process, care is to be taken, that all operations are carried out with the exclusion of air as far as possible on account of the sensitiveness to air of the starting- and end-products.

My new products thus obtainable probably are formaldehyde - bisulphite derivatives of the amino-aryl-antimony arsenic compounds used as starting materials. They are brownish colored powders, soluble in water, difficultly soluble in the usual organic solvents and are intended to be used for medicinal purposes in consequence of their solubility in water and their pharmaceutical activity.

The invention is illustrated by the following example, without being limited thereto:—

Example.—12 grams of the stibio-arseno-compound of the probable formula

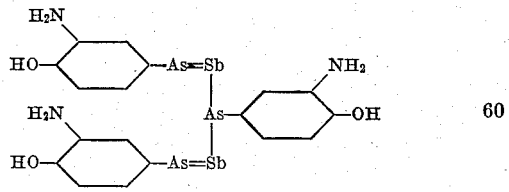

obtainable according to the directions of German Patent No. 397,275 from 3-amino-4-hydroxy-1-phenyl-arsine and potassium antimony-bis-(1.2 - dioxybenzene - 3.5-disulphonate), (compare especially Example 1 of said patent) are suspended in the freshly precipitated state in about 70 ccm. of water, and 7 grams of formaldehyde bisulphite, dissolved in a little water, are added. After standing for several days, solution takes place. The solution is filtered, neutralized with dilute caustic soda, the product formed is precipitated by pouring into methyl alcohol, isolated and dried in a desiccator. All operations are carried out with the greatest possible exclusion of air. A brown powder is obtained, which is readily soluble in water with a neutral reaction.

This is a devision of my copending application Ser. No. 404,216, filed November 1, 1929.

I claim:

1. The formaldehyde-bisulphite derivatives of compounds of the probable formula:

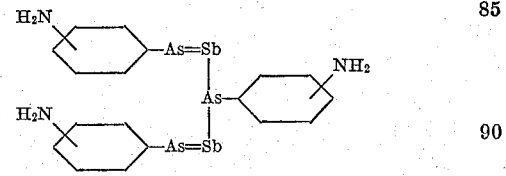

the benzene nuclei of which may be further substituted by a hydroxy group, said products being readily soluble in water, rather difficultly soluble in the usual organic solvents, displaying a therapeutic action.

2. The formaldehyde-bisulphite derivatives of the compound of the probable formula:

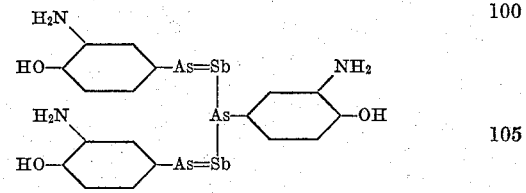

said products being readily soluble in water, rather difficultly soluble in the usual organic solvents, displaying a therapeutic action.

HANS SCHMIDT.